(12) United States Patent
Guo et al.

(10) Patent No.: US 7,506,141 B2
(45) Date of Patent: Mar. 17, 2009

(54) COMPUTER SYSTEM HAVING ENTERTAINMENT MODE CAPABILITIES

(75) Inventors: Yong Araz Guo, Shanghai (CN); Xiao Meng Leon Huang, Shanghai (CN); Sheau Chuen Shirley Her, San Jose, CA (US)

(73) Assignee: O2Micro International Limited, Grand Cayman (KY)

( * ) Notice: Subject to any disclaimer, the term of this patent is extended or adjusted under 35 U.S.C. 154(b) by 760 days.

(21) Appl. No.: 10/733,781

(22) Filed: Dec. 11, 2003

(65) Prior Publication Data

US 2005/0055545 A1 Mar. 10, 2005

Related U.S. Application Data

(60) Provisional application No. 60/501,464, filed on Sep. 9, 2003.

(51) Int. Cl.
*G06F 9/00* (2006.01)
*G06F 9/24* (2006.01)

(52) U.S. Cl. .............. 713/1; 713/2; 713/100; 713/182; 719/321; 719/328

(58) Field of Classification Search .............. 713/1, 713/2, 100, 182; 719/321, 322, 328
See application file for complete search history.

(56) References Cited

U.S. PATENT DOCUMENTS 6,813,777 B1* 11/2004 Weinberger et al. ........... 725/76

| | | | |
|---|---|---|---|
| 2002/0091863 A1* | 7/2002 | Schug | 709/250 |
| 2004/0006690 A1* | 1/2004 | Du et al. | 713/2 |
| 2005/0192089 A1* | 9/2005 | Blatter et al. | 463/29 |

FOREIGN PATENT DOCUMENTS

| FR | 2824927 | 5/2001 |
|---|---|---|
| JP | 2003-018677 | 1/2003 |
| JP | P2003-18677 A | 1/2003 |

OTHER PUBLICATIONS

Toshiharu Akanuma, Anxiety-free privacy even in multi-user systems. Complete strategy guide for user accounts, PCfan, Japan, Mainichi Communications Inc., Apr. 1, 2002 vol. 9, No. 9, p. 78.

(Continued)

*Primary Examiner*—Thomas Lee
*Assistant Examiner*—Michael J Brown

(57) ABSTRACT

A computer system having entertainment mode capabilities is provided. In an exemplary embodiment, the system may include an entertainment mode power switch. A machine-readable medium may be provided that includes instruction stored thereon that may perform operations including enabling entertainment mode user account data to be stored on the computer system. Further operations may include passing the entertainment mode user account data to an operating system logon process associated with the computer system when the entertainment mode power switch is activated to power the computer system. In at least one exemplary embodiment, the entertainment mode user account data is passed automatically to the operating system during a logon process.

20 Claims, 3 Drawing Sheets

OTHER PUBLICATIONS

Toshiki Inoue, Starting MySQL from the very beginning, SoftwareDesign, Japan, Gijutsu-Hyohron Co, Ltd., Mar. 18, 2003 p. 145.

P. Sharick: "Customizing Winlogon" Windowsitpro, online! Oct. 1, 1995, XP002315278 Retrieved from the Internet: URL: http://www.windoesitpro.com/Article/ArticleID/2269/2269.html> p. 1.

T Kerby, G Knutti: Novell Tips & Tricks: INET, Online! Jan. 17, 2001 XP002315267 Retrieved from the internet URL: hhtp://developer.novell.com/research/appnotes/1997/October/ntnotes/.03htm> p. 4.

The Computer Technology Project: "windowsnet booting" INET online! Jul. 1, 2002 XP002315268 Retrieved from the internet: URL:hhtp://www.comptechdoc.org/osw/windows/ntwsguide/ntwsbooting.html> p. 3.

Windows XP Tune-up Plan!, Nov. 1, 2002, DTM Magazine, vol. 9, No. 11, Japan, Terajima Kikaku Co., Ltd., Domestic technical magazine 2003-02356-015, pp. 72-75 total 4 pages.

Toshiki Inoue, Starting MySQL From the Very Beginning, SoftwareDesign, Mar. 18, 2003, Japan, Gijutsu0Hyohron Co., Ltd., vol. 149 pp. 145-150 total 6 pages.

* cited by examiner

COMPUTER SYSTEM HAVING ENTERTAINMENT MODE CAPABILITIES

The present invention claims priority to U.S. Provisional Application Ser. No. 60/501,464 filed Sep. 9, 2003.

FIELD

This disclosure relates generally to computers, and more particularly to a computer having entertainment mode capabilities.

BACKGROUND

A variety of operating systems are utilized in computers. Many operating systems, e.g., Microsoft Windows XP, can be used in a multi-user system that allows multiple users to logon and use the system. Before a user can use the system, an administrator typically creates a user account for the user. The application programs or data of the system can either be shared or protected depending on the user's particular configuration. Protection can be accomplished by setting a password during logon or by restricting the use of certain applications by certain users.

FIG. 1 is a flow chart 100 of a normal OS, e.g., Microsoft Windows XP, boot process on a computer having a normal power button. Once the user presses the normal power button 102, the OS will start to boot up and stop at a logon window 104 which prompts a user to enter security data such as the user's name and password 106. In block 108, the operating system is entered. Assuming the user is a registered user and enters accurate security data, the Operating System gives that user access to application programs and data that were previously established. If the system is password protected and a user is not a registered user or enters inaccurate security data, access to the system is denied. The system may not require security data in which case steps 104 and 106 are skipped and access is permitted after the OS boot process.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION

Figure 1:
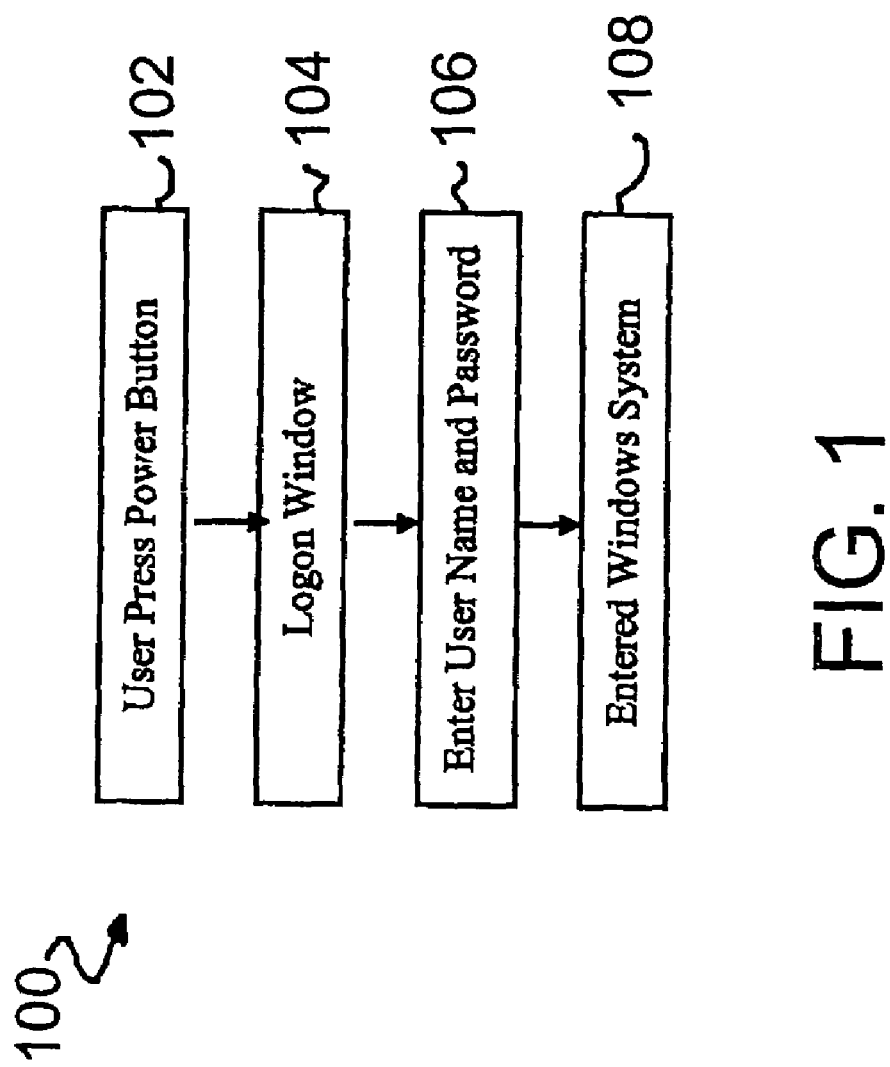
FIG. 1 is a flowchart of a conventional OS boot process.
Figure 2:
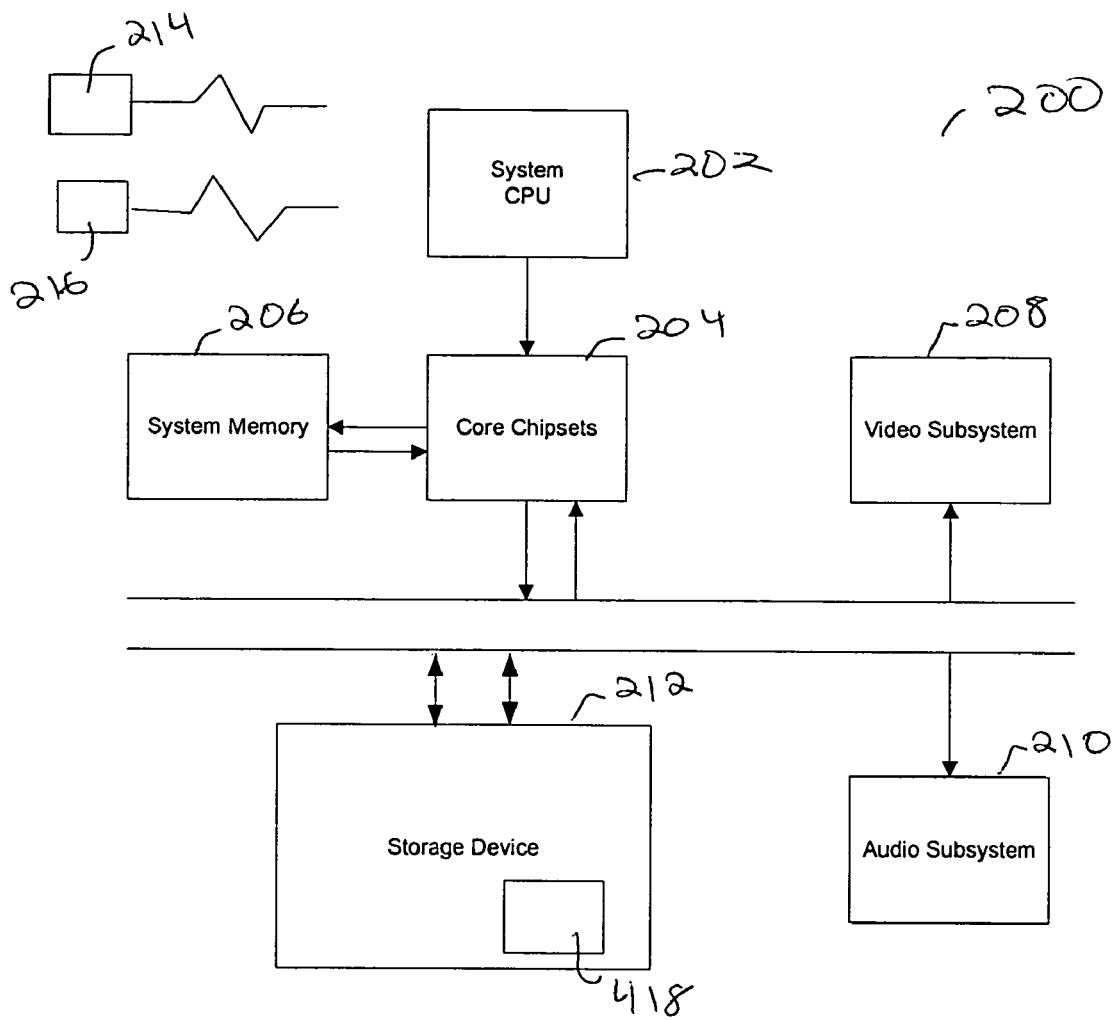
FIG. 2 is a block diagram of an exemplary entertainment mode computer system.

FIG. 2 is a block diagram of an entertainment mode application system 200 according to one embodiment. The system 200 may include conventional PC system components, such as a system CPU 202, core system chipsets 204 (e.g., North Bridge and/or South Bridge system components, and system memory 206. The system may also include a video subsystem 208 (which may comprise a video card coupled to a system bus and a monitor coupled to the video card) and audio subsystem 210 (which may include an audio card coupled to a system bus and speakers coupled to the audio card). The system may also comprise one or more storage devices 212, which may include one or more of a hard disk drive, CD/DVD ROM drive and/or flash memory drive. Such a storage device may contain video data, audio data, photographic data, or other types of data and any combination thereof. This embodiment may also include a conventional power switch 214 and an entertainment mode power switch 216. Each switch operates to power on the PC system components, in a manner described below.

It shall be assumed in the following detailed description that the PC system includes an operating system (OS) that is adapted to control one or more of the system components (described above) and to provide a user interface for user control. Such an OS may comprise, for example, Windows XP operating system. It should be understood at the outset that certain examples are provided herein with reference to a Windows XP OS, but it is equally contemplated that other OS systems can be used without departing from the present disclosure.

An entertainment mode application program 418 may be stored on the storage device (e.g., system hard drive) and may be operable to run and execute an entertainment application in a manner described below. "Entertainment mode" as used herein means a computer system (desktop PC, laptop PC, etc) that is configured to run a video and/or audio and/or digital photograph management application program. Such an application program may include conventional and/or proprietary application programs as may be includes with an operating system or provided by third-party vendors. For example, the present description of the present embodiment is directed to a video application program that permits a user to view video data on a computer system.

The video application program consistent with the invention may be executed by a user of a multi-user system that is isolated from other registered users. Further, the video application program may be adapted to provide a unique interface which may be assigned to a particular user. To this end, a video application program consistent with this embodiment may include executable code to complete two processes. The first process may create an entertainment mode user account with password protection. Such a process may comprise an initialization or installation program to perform the desired task. The entertainment mode account may be hidden from being displayed to prevent other users from obtaining username and/or password information. A second process may comprise automatically supplying entertainment mode account data to a convention OS logon process. The second process may be embodied as a driver that is adapted to call selected OS functions to perform an entertainment mode logon, and to set values in selected OS functions depending on whether an entertainment mode or conventional boot-up process is selected.

To ensure system security that is part of an OS logon process, the driver described herein may be adapted to ensure that a conventional logon process remains unaffected. In other words, when a user presses the conventional system power button, the driver may be adapted to remain inactive while a conventional OS logon process occurs. In this manner, the OS may then process logon and password checking in a conventional, secure manner. If a user presses the entertainment mode power button, the driver program may be adapted to pass the entertainment mode account data (e.g., user name and password) to the OS logon process (e.g., Winlogon processes). Since a valid username and password are provided to Winlogon, the logon process may proceed in a manner fully consistent with OS security. Once proper logon procedures have occurred, an entertainment mode application, for example a video application program, may be launched.

To enhance system security and remain fully compliant with OS security protocols, when a user presses the entertainment mode power button and entertainment mode account data is passed to the OS logon process, the video application program may be adapted to restrict access to selected system components, for example, by controlling some or all of the input devices (such as a keyboard and mouse). Thus, the video application may restrict access to selected areas of the hard drive and OS interface, and may provide that users can only control the video application and access video data. In an exemplary embodiment, such restrictions can be selected during the aforementioned initialization or installation process and may include hardware and/or software component restrictions.

Figure 3:
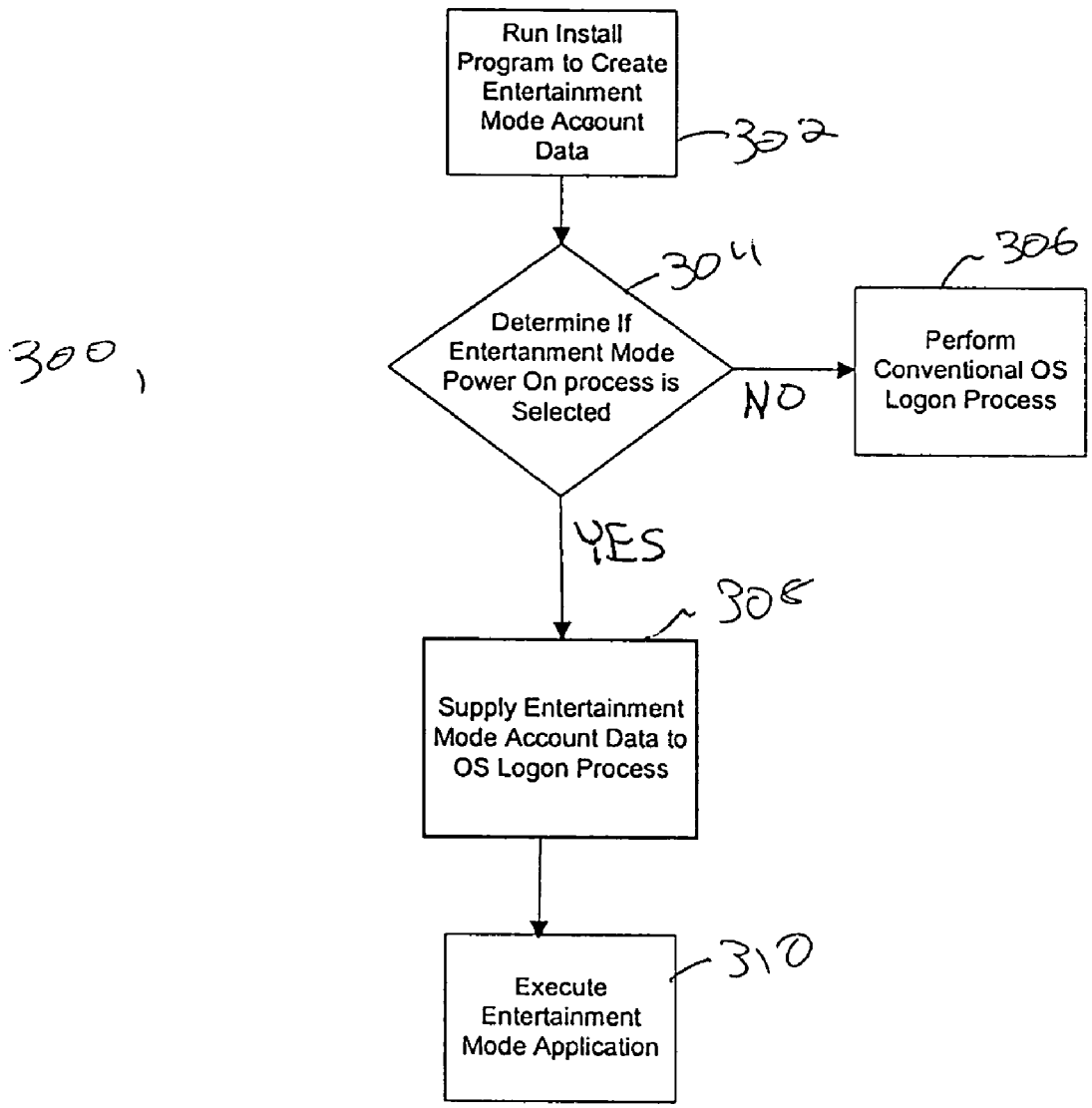
FIG. 3 is a flowchart depicting an exemplary process of providing an entertainment mode computer system having logon capabilities.

FIG. 3 is a flowchart 300 depicting an exemplary process of providing an entertainment mode computer system having logon capabilities. Entertainment mode user account data (e.g., username and password) may be created 302 when a video application program is installed in the Microsoft Windows OS. The user account data is stored on the computer. The process may also include determining if an entertainment mode (e.g., video mode) power on process is selected 304. In that regard, and referring again to FIG. 2, this process may include determining if the conventional power button 214 or entertainment mode power button 216 is pressed. If a conventional power button is pressed, then a conventional boot-up and logon process is performed 306. If an entertainment mode power button is pressed, then a conventional logon is performed by the OS, and the account data provided by the video application program is supplied to the logon process 308. The process may further specify that an entertainment mode application is to be executed 310, after the OS boot-up process is complete. In an exemplary embodiment, a video application program may be installed on the system and when an entertainment mode power button is pressed, the application program may be launched to permit a user to access video data on the computer system.

Thus, there is provided an entertainment mode computer system that includes automatic logon procedures fully consistent and compatible with OS security protocols. In addition to automatic logon procedures, the software of an exemplary embodiment may provide additional functionality, as detailed below. The installation program may be adapted to call selected Windows APIs to create entertainment mode user account and assign a password with the user. An exemplary API may include the NetUserAdd API that is a service module provided by Microsoft Windows to create user account data. Additionally, the installation program may be adapted to assign privileges and/or restrictions to a particular user. Privileges may include, for example, partially restricted access to hard disk data, access to certain directories on the hard drive, restrictions on OS interface access, etc.

After the entertainment mode user account is created, it may be desirable to hide that information (i.e., not display that information) to prevent being accessed by users who wants to use the Windows system. This may be accomplished by setting the appropriate value in the Windows system registry to prevent the video user's name from being displayed.

The driver described herein may be adapted to call selected Windows API services top perform additional tasks. To that end, the driver may be adapted to replace an entry point address of the selected APIs, such as may be defined in an import and/or export address table associated with an API. Depending on a desired user function, the driver may be adapted to execute selected API functions.

By way of example, the driver of the present embodiment may be adapted to interact with the following Windows functions:

1) WlxLoggedOutSAS:
This function is called by Winlogon when the OS receives a Secure Attention Sequence (for example, press ctl+alt+del keys) event while no user is logged on. If a user wants to run the OS, the driver may be adapted to permit Winlogon to call this function when user presses the ctl+alt+del keystrokes. Alternatively, if a user wants to operate the system using the entertainment mode application program, the driver may be adapted to call this function directly and pass the entertainment mode application user name and password to it.

2) WlxActivateUserShell:
This function is called by Winlogon following a successful logon to request that a Windows service (for example GINA) activate the user's shell program in the OS. If an entertainment mode application program such as described herein is running, the driver may be adapted to only load user profile, and show the desktop interface of the OS.

3) WlxIsLockOk:
Winlogon calls this function as a check to determine if it is safe to lock the OS, in a manner known in the art. If an entertainment mode application program such as described herein is running, the driver may be adapted to disable the lock function.

4) WlxLogOff:
Winlogon calls this function to notify the appropriate OS service (e.g., GINA service) of a logoff operation on the PC, allowing the service to perform any logoff operation that may be required. If an entertainment mode application program such as described herein is running, the driver may be adapted to complete a logoff process to log the entertainment mode application user off of the system.

5) WlxInitialize:
This API is called by the Winlogon once for each window station present on the computer. If the entertainment mode application program is running this function may return a TRUE value to tell the system that the GINA DLL was successfully initialized.

6) ExitWindowsEx:
This API is used by the driver to determine whether a user has requested a logoff user, system shutdown or system restart. If a user requests system shutdown, the entertainment mode application program may be adapted to convert a shutdown operation into a system hibernation operation. To that end, the entertainment mode application program may include instructions to direct Windows power management functions to operate in a desired manner.

Of course, these are only examples of some Windows functions that can be utilized by the present embodiment. Further, this embodiment is not limited to utilizing all or selected ones of the Windows APIs listed above, rather it is fully contemplated herein that the driver of the present invention can be adapted to call selected ones (or none) of the Windows functions cited above. It should be understood that the term "driver" as used herein should be given its ordinary meaning to one of skill in the art, and may be generally defined as a set of commands embodied in software and/or firmware.

The driver of one exemplary embodiment described herein may be adapted to supply a dynamic link library (DLL) module that may be accessed by the Winlogon process to achieve the functionality stated herein. For example, a DLL may be accessed by USER32.DLL (a Windows DLL module) by adding the name of the desired DLL to the Windows registry. Of course, such a process can specify a single DLL or a group of DLLs separated either by comma or spaces. In operation, once a driver is accessed by the Winlogon, an entry pointer address of the selected APIs may change in memory.

The entertainment mode application program may be embodied, for example, as a video application program, audio application program and/or digital photograph application program. It is fully contemplated herein that such an application program include appropriate hardware and software functionality to perform a desired function, for example, access video data on said computer system and display such video data on said computer system. To that end, it is further contemplated herein that the entertainment mode application program may be "upgraded" to provide future functionality and/or data format compatibility. By way of example, when the system 200 is embodied as a video mode entertainment system, the video application program described herein may be a conventional Windows video application program (e.g., Windows Media Player), or may be a custom and/or proprietary video application program.

It will be appreciated that the functionality of any "program" described herein may be implemented using hardware, firmware, software, or a combination thereof. If implemented in software, a processor, e.g., system CPU 202 and machine-readable medium may be adapted to contain and execute such software. The system CPU may include, for example the Pentium family of processors made by Intel, or a family of processors made by Motorola. Machine-readable medium may include any media known in the art (e.g., memory, disk drive, etc.) capable of storing instructions adapted to be executed by a processor.

The entertainment mode power switch 216, depicted in FIG. 2, may be adapted to supply power to the computer system in a manner well known in the art. For example, the switch may be adapted to generate an address to system BIOS (not shown) so that a boot process proceeds and calls the driver program to load the entertainment mode account data. Alternatively, an embedded microprocessor may be adapted to instruct the system to power up in a manner described above.

Thus, it is evident that the present invention provides a PC system that includes entertainment mode capabilities. Also, advantageously, the entertainment mode of the present disclosure may include automatic logon capabilities. It is to be understood that the embodiments that have been described herein are only exemplary, and the present disclosure is not limited to any of these embodiments. It will be apparent to those skilled in the art that many modifications may be made to the embodiments described herein, and all such modifications are deemed within the spirit and scope of the disclosure, only as limited by the claims.

The invention claimed is:

1. An apparatus, comprising:
a machine-readable medium having stored thereon instructions that when executed by a machine result in said machine performing operations comprising:
selecting a mode between a normal mode and an entertainment mode for a computer system;
enabling a driver to pass predefined entertainment mode user account data stored on said computer system to an operating system (OS) of said computer system and to execute at least one API function of said OS if said entertainment mode is selected;
enabling said OS to boot using said predefined entertainment mode user account data if said entertainment mode is selected; and
disabling said driver if said normal mode is selected.

2. An apparatus as claimed in claim 1, wherein said instructions further perform operations comprising:
enabling said OS to perform a normal boot process if said normal mode is selected.

3. An apparatus as claimed in claim 1, wherein said instructions further perform operations comprising: executing an entertainment mode application program to permit data associated with said entertainment mode application program to be accessed.

4. An apparatus as claimed in claim 3, wherein said instructions further perform operations comprising: enabling said entertainment mode application program to control access to selected hardware components of said computer system.

5. An apparatus as claimed in claim 3, wherein said instructions further perform operations comprising: enabling said entertainment mode application program to control access to selected software components of said computer system.

6. An apparatus as claimed in claim 3, wherein said entertainment mode application program comprises a video application program executing instructions to permit video data to be accessed on said computer system.

7. An apparatus as claimed in claim 3, wherein said entertainment mode application program comprises an audio application program executing instructions to permit audio data to be accessed on said computer system.

8. An apparatus as claimed in claim 3, wherein said entertainment mode application program comprises a digital photograph application program executing instructions to permit digital photograph data to be accessed on said computer system.

9. A method, comprising:
enabling an installation program to store entertainment mode user account data on a computer;
selecting a mode between a normal mode and an entertainment mode for said computer;
enabling a driver to load said entertainment mode user account data stored on said computer into a logon application of an operating system and to execute at least one API function of said operation system if said entertainment mode is selected; and
disabling said driver if said normal mode is selected.

10. A method as claimed in claim 9, further comprising:
enabling an entertainment mode application program to be executed on said computer, after said operating system completes a boot up process in said entertainment mode.

11. The method as claimed in claim 10, further comprising:
enabling said entertainment mode application program to control access to selected hardware components of said computer.

12. The method as claimed in claim 9, further comprising:
enabling said operating system to perform a normal boot process if said normal mode is selected.

13. The method as claimed in claim 9, further comprising:
enabling an installation program to create said entertainment mode user account data on said computer.

14. The method as claimed in claim 9, further comprising:
enabling an operating system function to create at least one of a username and password; and
associating at least one of said username and password with said entertainment mode user account data.

15. A system, comprising:
a computer system that comprises an entertainment mode power switch; and a machine-readable medium having stored thereon instructions that when executed by a machine result in said machine performing operations comprising:

enabling entertainment mode user account data to be stored on said computer system;

enabling a driver to pass said entertainment mode user account data stored on said computer system to a logon process of an operating system associated with said computer system and to execute at least one API function of said operating system if said entertainment mode power switch is activated to power said computer system; and disabling said driver if a normal power button is activated to power said computer system.

16. A system as claimed in claim 15, wherein said entertainment mode user account data is automatically passed to said operating system logon process.

17. A system as claimed in claim 15, wherein said instructions further perform operations comprising enabling an entertainment mode application program to be executed after said logon process, and wherein said entertainment mode application program is adapted to permit video associated with said computer system to be accessed.

18. A system as claimed in claim 17, wherein said instructions further perform operations comprising: enabling said entertainment mode application program to control access to selected hardware components of said computer system.

19. A system as claimed in claim 17, wherein said instructions further perform operations comprising: enabling said entertainment mode application program to control access to selected software components of said computer system.

20. A system as claimed in claim 15, wherein said instructions further perform operations comprising:

enabling an installation program to create said entertainment mode user account data on said computer system; and enabling an operating system function to create at least one of a username and password and associating at least one of said username and password with said entertainment mode user account data.

* * * * *